March 17. 1925.
C. I. HALL
CONSTANT SPEED MECHANISM
Filed June 14, 1921
1,530,259
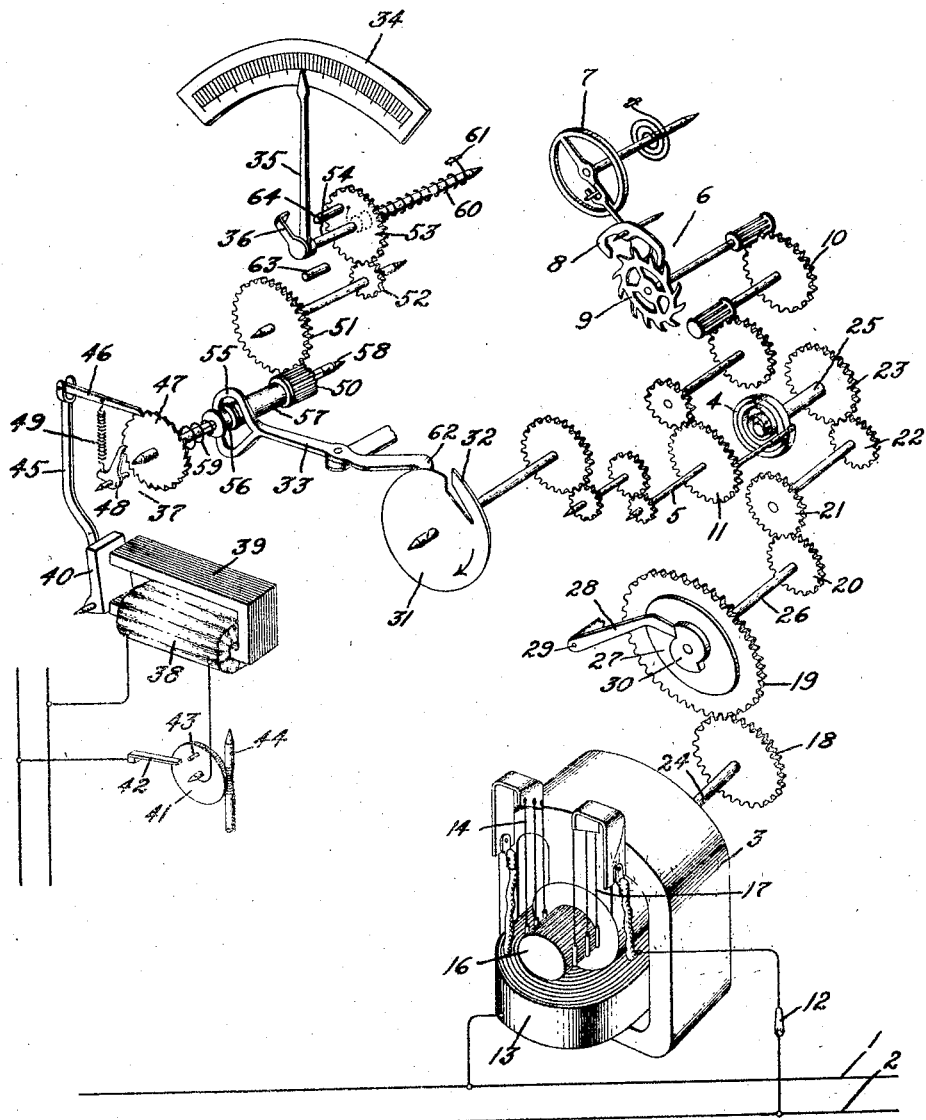
Inventor:
Chester I. Hall,
by Albert G. Davis
His Attorney.

Patented Mar. 17, 1925.

1,530,259

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

CONSTANT-SPEED MECHANISM.

Application filed June 14, 1921. Serial No. 477,605.

*To all whom it may concern:*

Be it known that I, CHESTER I. HALL, a citizen of the United States, residing at Fort Wayne, in the county of Allen, State of Indiana, have invented certain new and useful Improvements in Constant-Speed Mechanism, of which the following is a specification.

My invention relates to a constant speed mechanism and more particularly to such a mechanism used in connection with electrical instruments, such as maximum demand indicators.

In many types of recording instruments it is necessary to supply some form of mechanism having a uniform speed, such as a clock. For example, in recording electrical ammeters or volt meters a chart or record sheet must be advanced at a uniform rate. In another type of electrical instrument which is so arranged that it measures the energy expended in any circuit for definite equal intervals of time or where it measures the length of time which it takes for equal quantities of electrical energy to be used, a clock or its equivalent must be used. An ordinary mechanical clock is disadvantageous since it must be wound up by hand periodically, and it may not run isochronously from the condition when it is fully wound to the condition when it is nearly run down. In these types of instruments it has been proposed to use a constant speed motor, or a motor so arranged that it winds the springs of a clock movement at periodic intervals. On ordinary circuits it is extremely difficult to control a motor in such a way that its speed remains so nearly constant that it may become useful as a substitute for a clock. On the other hand, periodically energized motors require contacts to be made and broken. These contacts become unreliable after a long period of service, and replacements are often necessary.

It is the main object of my invention to make it possible to utilize an electric motor for keeping the clock spring wound, without it being necessary to have contacts made or broken. It is another object of my invention to prevent the motor from injuring permanently the spring of the constant speed mechanism by overwinding. I attain these objects by interposing a mechanical connection between the winding motor and the spring so arranged that it comprises substantially a rigid connection while the spring is not in its fully wound condition. When the spring is fully wound this connection is so arranged that the energy supplied by the motor as well as its kinetic energy of rotation are absorbed in another way than by an action on the spring. I find it advantageous to use a motor having series characteristics; that is, one in which the speed of the motor decreases rapidly as the torque increases. When such a motor is used, while the spring is being wound the speed is comparatively great, since the torque is small. As the torque increases, the speed of the motor is reduced. When the spring is fully wound, if no precautionary measures would be taken, the motor would exert such a strong torque that the spring would break. The connection mentioned heretofore is so arranged that the energy of the motor is absorbed after the spring is fully wound by friction between two surfaces. The friction between these two surfaces, however, is so great that as soon as the momentum of the motor is checked thereby, the opposing force due to this friction is sufficient to bring the motor to rest. It stays at rest until the spring is sufficiently unwound to permit the motor to start up again. This arrangement has the advantage that all contacts are obviated and that there is no danger of the spring breaking. Further, very little energy is absorbed uselessly in friction which is not the case if the connection between the motor and spring would be a constantly slipping one.

Other objects and advantages of my invention will become apparent as the description proceeds.

For a better understanding of my invention, reference is to be had to the following specification together with the accompanying drawing in which the single figure is a distorted perspective view showing how a constant speed mechanism embodying my invention is utilized in an electrical maximum demand indicator.

Referring now more in detail to the drawing, I have shown in the present instance a pair of conductors 1 and 2 which are therefore connected to a source of electrical energy. The electric motor 3, here shown as an ordinary direct current series motor, is connected through various mechanical connections to be described later to the inner end of resilient member or spring 4 which serves as the actuating member of the constant speed mechanism. The outer end of the spring 4 is so arranged that it drives a constant speed shaft 5. To cause this shaft 5 to have a constant speed, an escapement mechanism shown generally by the numeral 6 is utilized. In the present instance a marine escapement is shown comprising a balance wheel 7, verge 8 and an escapement wheel 9. Since such escapements are well known, it is not essential to describe this portion of the mechanism in any greater detail. The escapement wheel 9 is mechanically connected as by the gearing 10 to a gear 11 rigidly connected to the constant speed shaft 5, which gear 11 also serves to supply an anchoring point for the outer end of the spring 4.

The small series motor 3 is connected across the conductors 1 and 2 through a connecting means such as the switch 12. The current from conductor 1 flows through the field coil 13 of the motor, then from the field coil through brushes 14, through the armature and commutator 16, through the other set of brushes 17, back to the line 2 through the switch 12. By means of gears 18, 19, 20, 21, 22 and 23 the speed of the motor shaft 24 is sufficiently reduced so that the energy supplied by the motor 3 may be utilized to wind up the inner end of the spring 4. The entire motor 3 is of course of a very small size, since but little power is required therefrom. The last gear 23 of the train is rigidly connected to a shaft 25 connected to the inner end of the spring 4, as clearly shown on the drawing. The shaft 26, to which gear 20 is fastened in the train of gears between the shaft 24 and the shaft 25 is not rigidly connected to gear 19 in the train but instead it is rigidly connected to a disc 27 of some material which has a large coefficient of friction with respect to the metal surface of gear 19. For example, horn fibre might be used. The disc 27 and the gear 19 are pressed together when assembled so that there is substantially a rigid connection between them until the torque exerted by the motor 3 becomes abnormally great. To prevent the spring 4 from unwinding if for any reason the motor be disconnected from the source, I provide a pawl 28 pivoted on the stationary pivot 29 coacting with a ratchet wheel 30 rigidly fastened to the shaft 26. The ratchet wheel 30 may also serve conveniently as the means for holding the disc 27 and the gear 19 closely together. The entire mechanism operates in such a way that the spring 4 is constantly being wound and is supplied with substantially all of the energy developed by motor 3 until it is fully wound. When it is fully wound, breaking of the spring is prevented by the connection between gear 19 and the disc 27, which slide one upon the other until the motor 3 is gradually brought to rest. The spring has sufficient length that it may run for an appreciable time even after the circuit 1—2 is interrupted.

The constant speed mechanism is utilized in the present instance to drive at a constant speed a rotatable cam 31 in the direction shown by the arrow thereon. The interval required for a complete revolution of the cam 31 may be 15 or 30 minutes or any other length of time during which it is desired to measure the amount of energy expended in an electric circuit. The cam 31 has a raised portion 32 arranged to coact with a pivoted lever 33 for rocking it slightly once for each revolution of the cam 31.

The demand indicator illustrated in the present instance comprises a scale 34 and a cooperating non-return pointer 35 arranged to be driven by an actuator 36. The movement of the actuator 36 is accomplished by means of a pawl and ratchet mechanism 37 electro-magnetically operated by the coil 38, its core 39, and the armature 40. The circuit for coil 38 is closed in the present instance once for each revolution of a wheel 41 by means of the stationary contact 42 and the contact 43 mounted on the wheel 41. The wheel 41 carrying the contact 43 is shown in this instance as directly geared to a spindle 44 of a watthour meter not shown. It is evident that upon equal expenditures of energy measured by the watthour meter corresponding to one revolution of wheel 41, the shaft 44 is actuated sufficiently to make contact between parts 42 and 43 and to energize the electro-magnet 38. The electro-magnet 38 then attracts the armature 40 to which is rigidly connected the arm 45 which in turn carries a pivoted pawl 46 coacting with the ratchet wheel 47. It is thus evident that for each energization of the coil 38 the ratchet wheel 47 is advanced by a constant amount. In order to prevent the ratchet wheel from rotating in a backward direction a pivoted pawl 48 is provided. To keep these pawls in engagement with the teeth of the ratchet wheel 47, I make use of a light helical spring 49 connecting the two pawls 46 and 48. The ratchet wheel 47 is normally connected through gears 50, 51, 52 and 53 with the shaft 54 carrying the actuator 36. The constant speed mechanism, however, is so arranged that it disconnects the driving connection between the shaft 54 and the ratchet wheel 47 periodically. This is accomplished by the rotation of the pivoted lever 33. This lever has a fork 55 engaging in the groove 56 of a slidable sleeve 57. This sleeve carries the gear 50 and has a slidable but non-rotatable connection with the shaft 58, as by means of a spline. A spring 59 arranged on shaft 58 serves to urge the sleeve 57 rearwardly and to keep the gear 50 in mechanical connection with the gear 51, and the end 62 of lever 33 against the surface of cam 31. However, when the portion 32 of the cam 31 rotates to a slight extent the pivoted lever 33, this spring 59 is compressed and the gear 50 is disconnected from the gear 51. When this occurs, the actuator 36 comes back to its zero position, since the shaft 54 to which it is connected is urged to that position by means of the spring 60 wound thereon and having one end connected to a stationary post 61 and the other end connected to the gear 53. This zero position is determined by a stationary post 63, against which the post 64 carried by gear 53 is urged when the spring 60 is free to act.

It is thus evident that upon equal intervals of time the actuator 36 is made to return to its zero position. The actuator 36 serves to push forward the pointer 35 in case the travel of this actuator is greater than any it has had previously. The amount of movement of the actuator 36 during these equal intervals of time is made dependent upon the amount of energy expended in any circuit by means of the electro-magnet 38 and pawl and ratchet arrangement.

The particular use to which my constant speed mechanism is put is described merely by way of example. It is evident that it may be used in any other type of instrument where it is necessary to obtain a constant speed either to indicate the time of day, to actuate a chart, or to actuate mechanism in equal intervals of time as in this case. It is also evident that my invention is not limited to the specific embodiment shown in the drawings and I aim to embrace in the appended claims all modifications falling fairly within the spirit and scope of my invention.

What I claim as new and desire to secure by Letters Patent of the United States, is:—

1. In a constant speed mechanism, means for supplying energy to the mechanism comprising a resilient member for storing mechanical energy, a motor active at all times for supplying energy to said member, and a frictional driving connection between said motor and member adjusted to absorb sufficient of the motor energy to stop the latter after the resilient member is supplied with all the energy it can safely possess.

2. In a constant speed mechanism, means for supplying energy to the mechanism comprising a spring for storing mechanical energy, a constantly energized motor having series characteristics for winding the spring, and means whereby substantially the entire torque of said motor is used for winding up said spring, and whereby the motor after the spring is fully wound is gradually brought to rest.

3. In a constant speed mechanism, means for supplying energy to the mechanism comprising a spring, a constantly energized motor active at all times for winding the spring, and a driving connection between the motor and the spring arranged to stop said motor after the spring is fully wound.

4. In a constant speed mechanism, means for supplying energy to the mechanism comprising a spring for storing mechanical energy, a constantly energized motor having series characteristics for winding the spring, and a mechanical connection between the motor and the spring so arranged that substantially all the torque of the motor is utilized for winding the spring until it is fully wound, and that it gradually brings the motor to rest after the spring is wound.

5. In a constant speed mechanism, means for supplying energy to the mechanism comprising a spring for storing mechanical energy, a constantly energized motor having series characteristics for winding the spring, and a mechanical connection between the motor and the spring that is substantially rigid until the spring is fully wound, but that permits slipping thereafter until the motor comes to rest.

In witness whereof, I have hereunto set my hand this 10 day of June, 1921.

CHESTER I. HALL.